United States Patent
McCarty et al.

(10) Patent No.: US 11,468,623 B2
(45) Date of Patent: Oct. 11, 2022

(54) VISUALIZING AND EVALUATING 3D CROSS-SECTIONS

(71) Applicant: Vertex Software LLC, Des Moines, IA (US)

(72) Inventors: Michael McCarty, Ames, IA (US); Gerrick Bivins, Ames, IA (US); Alexander Prinsen, Ames, IA (US); Daniel Schultz, Ankeny, IA (US); Daniel Murray, Ames, IA (US)

(73) Assignee: Vertex Software, Inc., Des Moines, IA (US)

( * ) Notice: Subject to any disclaimer, the term of this patent is extended or adjusted under 35 U.S.C. 154(b) by 0 days.

(21) Appl. No.: 17/162,577

(22) Filed: Jan. 29, 2021

(65) Prior Publication Data

US 2021/0256758 A1   Aug. 19, 2021

Related U.S. Application Data (60) Provisional application No. 62/967,490, filed on Jan. 29, 2020.

(51) Int. Cl.
| | |
|---|---|
| *G06T 15/06* | (2011.01) |
| *G06T 15/20* | (2011.01) |
| *G06T 7/73* | (2017.01) |
| *G06T 19/00* | (2011.01) |

(52) U.S. Cl.
CPC .............. *G06T 15/06* (2013.01); *G06T 7/75* (2017.01); *G06T 15/20* (2013.01); *G06T 19/00* (2013.01); *G06T 2207/20212* (2013.01); *G06T 2211/432* (2013.01); *G06T 2219/008* (2013.01)

(58) Field of Classification Search
CPC .......................... G06T 2219/012; G06T 19/20
See application file for complete search history.

(56) References Cited

U.S. PATENT DOCUMENTS

| | | | |
|---|---|---|---|
| 5,782,762 A | 7/1998 | Vining | |
| 10,475,227 B1* | 11/2019 | Pajerski | ................. G06T 15/08 |
| 2001/0050686 A1 | 12/2001 | Allen | |
| 2005/0017074 A1 | 1/2005 | Tsikos et al. | |
| 2006/0044308 A1* | 3/2006 | Akutsu | .................. G06T 19/00 |
| | | | 345/423 |
| 2007/0291032 A1* | 12/2007 | Hashima | .................. G06T 7/11 |
| | | | 345/420 |

(Continued)

OTHER PUBLICATIONS

International Search Report and Written Opinion dated Apr. 8, 2021 for PCT Application No. PCT/US21/15833, 10 pages.

(Continued)

*Primary Examiner* — Ryan McCulley
(74) *Attorney, Agent, or Firm* — William J. Lenz; Neal, Gerber & Eisenberg LLP (57) ABSTRACT

Methods, systems, and computer-readable media for generating a cross-section of a 3D model are disclosed. An example method includes determining a cross-section plane intersecting the 3D model, performing ray-tracing by passing each of a plurality of rays through a corresponding pixel of a viewing plane such that each ray intersects the cross-section plane, determining one or more rays that are within a threshold distance of the 3D model at their respective points of intersection with the cross section plane, and highlighting pixels corresponding to the determined rays.

15 Claims, 5 Drawing Sheets

(56) References Cited

U.S. PATENT DOCUMENTS

| | | | |
|---|---|---|---|
| 2012/0223937 A1 | 9/2012 | Bendall | |
| 2018/0025548 A1* | 1/2018 | Endo | G06T 7/149 |
| | | | 382/284 |
| 2018/0182159 A1* | 6/2018 | Cohen | G06T 15/06 |
| 2020/0054398 A1* | 2/2020 | Kovtun | G16H 40/63 |
| 2020/0151874 A1* | 5/2020 | Peterson | G06T 7/0016 |

OTHER PUBLICATIONS

International Preliminary Report on International Report on Patentability for PCT/US2019/015101 dated Aug. 11, 2022.

\* cited by examiner

VISUALIZING AND EVALUATING 3D CROSS-SECTIONS

CROSS-REFERENCE TO RELATED APPLICATIONS

This application is a non-provisional application of U.S. Provisional Patent Application Ser. No. 62/967,490, filed Jan. 29, 2020, entitled "VISUALIZING AND EVALUATING 3D CROSS-SECTIONS" and is incorporated by reference in its entirety.

FIELD OF THE DISCLOSURE

This disclosure relates generally to three-dimensional (3D) modeling, and, more particularly, to methods and systems for visualizing and evaluating the intersection of a 3D polygonal model with a 3D cross-section plane.

BACKGROUND 3D geometric models are often used to design products for manufacture (e.g., in architecture, construction, real estate, gaming, healthcare, scientific visualization, movies, etc.). During the design process, iterative changes to a 3D model are often made to develop a final design that can be used by engineers, technicians, draftspeople, manufacturers, and more. During the design process, it can be beneficial for the designer of the 3D model to be able to manipulate the 3D model in real-time, take measurements between various surfaces of the 3D model, and otherwise interact with the 3D model. In particular cases, it may be beneficial for the designer of the 3D model to be able to take a cross-section of the 3D model, and interact with the surfaces of the model that lay on the plane of the cross-section.

SUMMARY

Examples disclosed herein may enable the visualization and evaluation of the intersection of a 3D polygonal model with a 3D cross-section plane. In particular, a method of generating a cross-section of a 3D model is disclosed. The method of generating the cross-section includes determining a cross-section plane intersecting the 3D model. The method also includes performing ray-tracing by passing each of a plurality of rays through a corresponding pixel of a viewing plane such that each ray intersects the cross-section plane. The method further includes determining one or more rays that are within a threshold distance of the 3D model at their respective points of intersection with the cross section plane. And the method still further includes highlighting pixels corresponding to the determined rays the same color along and within the threshold distance of the plane.

In another example, a non-transitory, computer-readable medium, has instructions stored thereon that, when, executed by a processor, cause the performance of a set of acts for generating a cross-section of a 3D model. The set of acts includes determining a cross-section plane intersecting the 3D model, performing ray-tracing by passing each of a plurality of rays through a corresponding pixel of a viewing plane such that each ray intersects the cross-section plane, determining one or more rays that are within a threshold distance of the 3D model at their respective points of intersection with the cross section plane, and highlighting pixels corresponding to the determined rays the same color.

In a third example, a system for generating a cross-section of a 3D model is disclosed. The system includes a memory configured to store data corresponding to the 3D model, and a processor. The processor is configured to determine a cross-section plane intersecting the 3D model, perform ray-tracing by passing each of a plurality of rays through a corresponding pixel of a viewing plane such that each ray intersects the cross-section plane, determine one or more rays that are within a threshold distance of the 3D model at their respective points of intersection with the cross-section plane, and highlight pixels corresponding to the determined rays the same color.

BRIEF DESCRIPTION OF THE DRAWINGS

The figures are not to scale. Wherever possible, the same reference numbers will be used throughout the drawings and accompanying written description to refer to the same or like parts.

DETAILED DESCRIPTION

As noted above, it can be beneficial for a designer of a 3D model, or other interested parties, to be able to manipulate and interact with the 3D model. In particular, it can be beneficial to view a cross-section of the 3D model, to reveal internal components and their interactions with each other. Providing a cross-section of the 3D model can enable a designer to interact with, analyze, and evaluate the 3D model by selecting surfaces, measuring distances between one or more selected surfaces or points, ensuring clearance between various components, and more.

In general, the term 3D model as used herein may refer to a mathematical representation of the surfaces of an object in three dimensions. The 3D model may comprise a single component, or may comprise a plurality of components. In some examples, the plurality of components may be configured to move with respect to each other, such as by rotating, sliding, bending, and more. Each component may comprise a particular geometry, and may be made from one or more surfaces connected to each other. Each of the surfaces may be defined mathematically, such that the surface may exist in only two dimensions (e.g., it may be infinitely thin in the third dimension).

In some embodiments, the 3D model may be rendered on a screen using ray tracing. Ray tracing, as used herein, may be understood as a rendering technique for generating an image by tracing the path of light (i.e., rays) as pixels in a viewing plane. Each ray is cast from the perspective of a corresponding pixel of the viewing plane. Based on the first intersection of the ray with either the 3D model or the background, the corresponding pixel is displayed using a particular color, shading, etc. For example, if a first ray is cast from a first pixel and intersects a first component of the 3D model, the first pixel may be colored red. If a second ray is cast from a second pixel and intersects a second component of the 3D model, the second pixel may be colored blue. When all the rays are cast, they can result in an image in which the first component is colored red, and the second component is colored blue.

Figure 1:
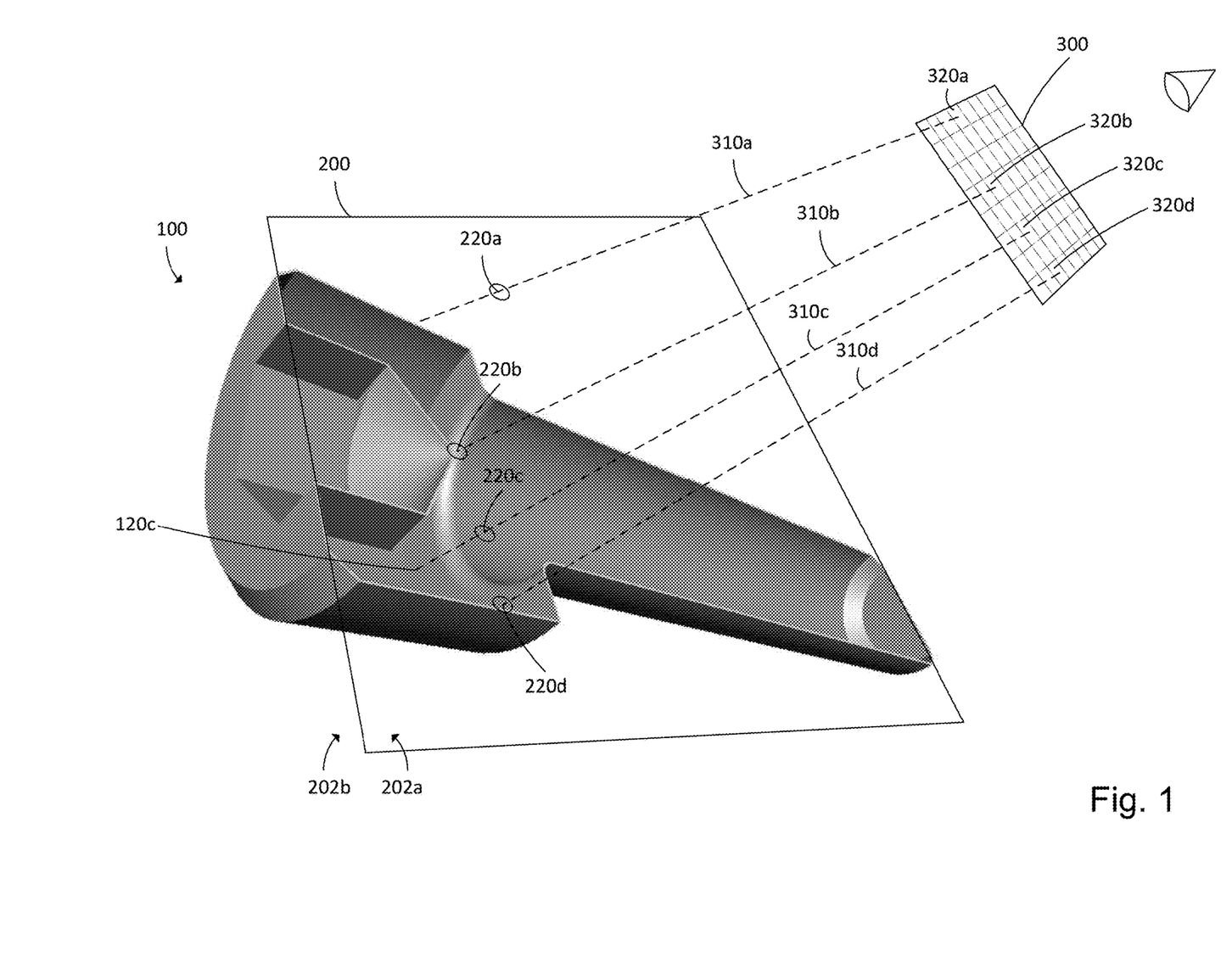
FIG. 1 illustrates a perspective view of an example cross-section of a 3D model according to embodiments of the present disclosure.
Figure 2:
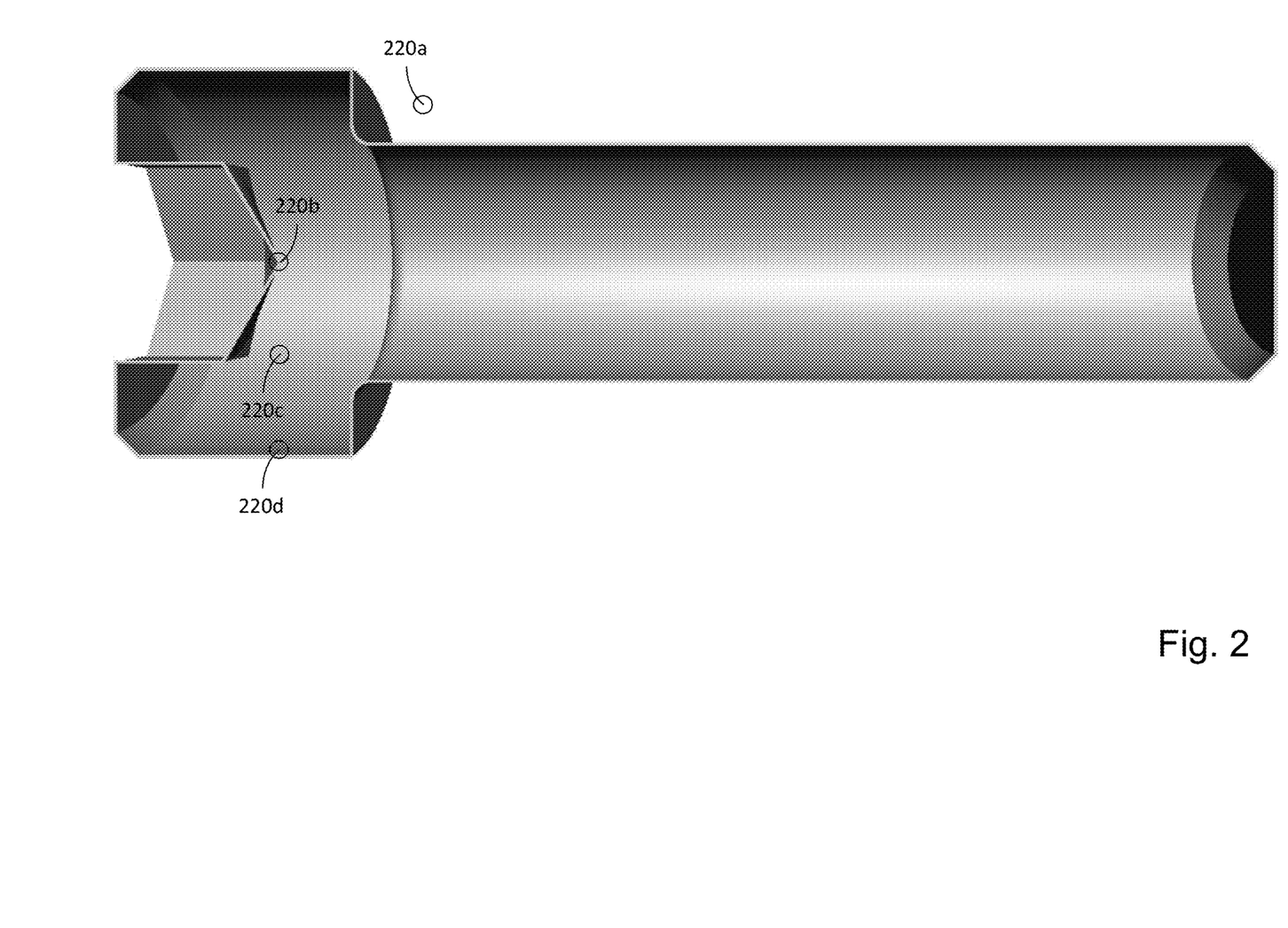
FIG. 2 illustrates a front view of the cross-section of the 3D model of FIG. 1.
Figure 3:
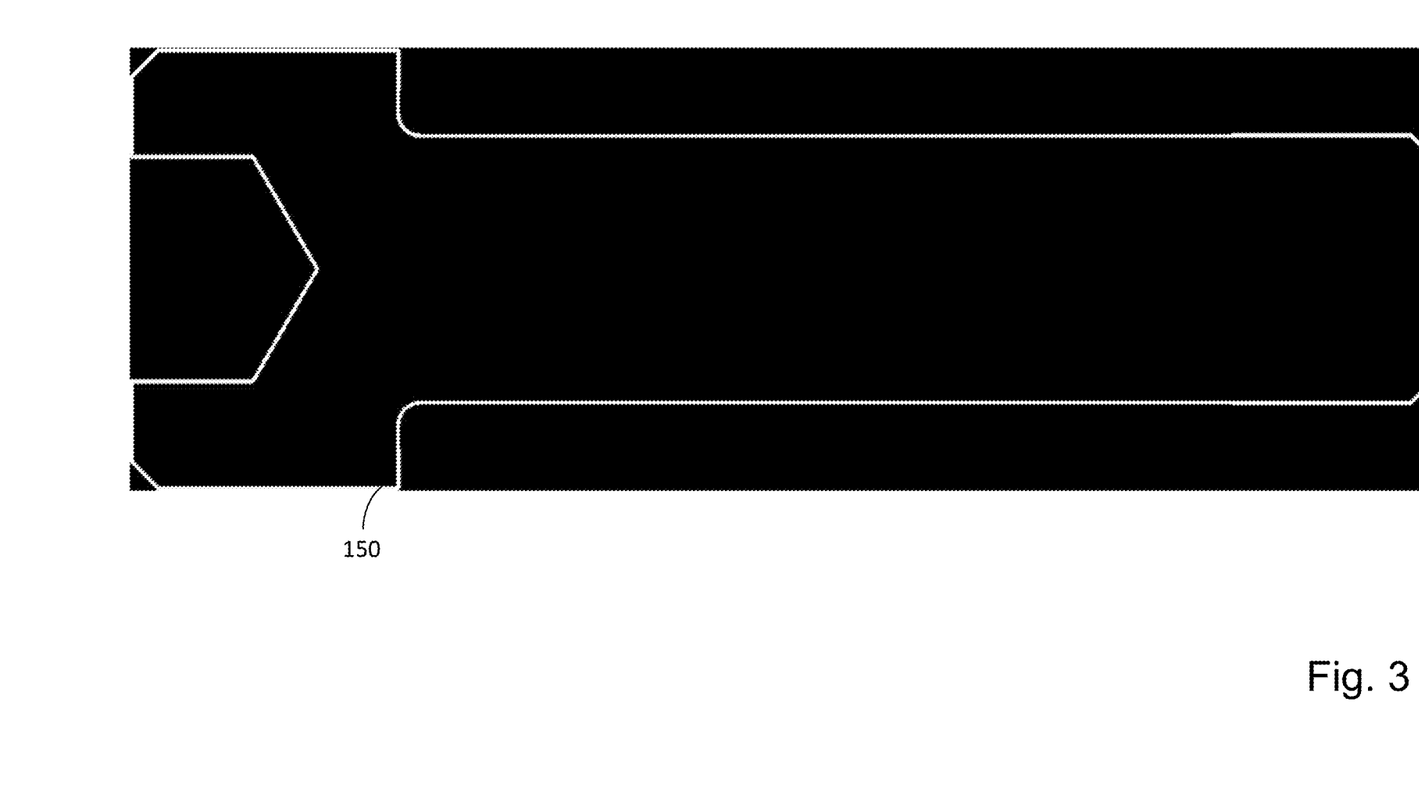
FIG. 3 illustrates a front view of a stencil comprising the intersection between the 3D model and the cross-section plane of FIG. 1.

Referring now to FIGS. 1-3, an example embodiment is illustrated in which a cross section is taken of a 3D model 100. The functions described herein, such as selecting a cross-section plane, ray tracing, and displaying the cross-section may be performed by a system that includes, among other things, a memory and a processor. The system may include one or more computing devices, such as the computing device described with respect to FIG. 4. In some examples, the system may include a plurality of computing devices (e.g., a distributed system), wherein the 3D model is broken into component parts or shards to be analyzed and processed independently from each other. This is discussed in further detail below.

In some examples, the processor is configured to (1) determine a cross-section plane intersecting the 3D model, (2) perform ray-tracing by passing each of a plurality of rays through a corresponding pixel of a viewing plane such that each ray intersects the cross-section plane, (3) determine one or more rays that are within a threshold distance of the 3D model at their respective points of intersection with the cross section plane, and (4) highlight pixels corresponding to the determined rays the same color.

Regarding the first feature noted above, the embodiment shown in FIGS. 1-3 illustrates that the processor may be configured to determine a cross-section plane 200 intersecting the 3D model 100.

In some examples, the cross-section plane 200 may be selected by a user, via a user interface of the system. The cross-section plane 200 may be positioned at a midpoint of the 3D model 100 by default. In some examples, the cross-section plane 200 may be set or positioned based on a selected component, surface, or other part of the 3D model 100. For example, a user may select a target surface, and the cross-section plane 200 may be positioned at the midpoint of the target surface, an edge of the target surface, or otherwise at a position based on the target surface. In some examples, the position of the cross-section plane 200 may be input by a user, such as via an input of a particular X, Y, Z, coordinate or distance. In some examples, the system may enable a user to change the position of the cross-section plane 200 in 3D space via a slider, arrow key, mouse, touch, or other user input.

Additionally, the cross-section plane 200 can be oriented in various orientations with respect to the 3D model 100. For example, the orientation may be set as parallel to the viewing plane 300 by default, such that it is perpendicular to the view of the user. In some examples, the orientation of the cross-section plane 200 may be modified or adjusted by the user, such as via an input via a slider, arrow key, mouse, touch, or other user input. In some examples, the orientation of the cross-section plane can be set based on a selected component, surface, or other feature of the 3D model 100. For example, the orientation can "snap" to a particular selected surface, such that the cross-section plane 200 is oriented parallel to or tangent to the selected surface.

In some examples, the system may include a menu with selectable options for a user to select, to enable the system to switch between various modes. For instance, there may be a default mode, a select component mode, a select face mode, a select distance mode, a manual input mode, and more.

In some examples, the cross-section plane 200 defines a front side 202a and a back side 202b of the 3D model 100. The front side 202a is the side of the 3D model 100 that is closer to the viewing plane 100. The back side 202b is the side of the 3D model that is opposite the viewing plane 100. It should be appreciated that the nomenclature "front side" and "back side" are used herein for example only. The front side and back side may be flipped, such that the front side is on the side of the cross-section plane 200 that is opposite the viewing plane 300. This can occur, in particular, where the viewing plane is rotated around the 3D model 100 to enable the user to view the back of the 3D model. In some cases, causing the viewing plane 300 to rotate around the 3D model 100 can cause the front side 202a and back side 202b of the model to remain the same, such that the user is still able to view the back side 202b of the 3D model 100. Alternatively, in some examples causing the viewing plane 300 to rotate around the 3D model 100 can cause the front side 202a and back side 202b of the model to flip, such that when the viewing plane 300 is located on the back side 202b of the model, only the front side 202a of the model is visible (i.e., the opposite of FIG. 1).

In some examples, the cross-section plane 200 is defined mathematically, such that it is infinitely thin. Alternatively, the cross-section plane 200 can be defined by use of a threshold distance therefrom in order to create a thickness for the cross-section plane 200. Further, as will be described in more detail below, for each pixel where the ray intersects with the 3D model at the cross-section plane 200, a threshold is determined and applied to create a specific threshold distance or thickness for the cross-section plane 200 for that pixel; as such, the cross-section plane 200 can have different effective thicknesses at the 3D model intersection for each pixel.

The processor may also be configured to perform ray-tracing, by passing each of a plurality of rays through a corresponding pixel of a viewing plane 300 such that each ray intersects the cross-section plane 200. To perform the ray tracing, each ray (e.g., rays 310a, 310b, 310c, and 310d) are cast from a corresponding pixel (e.g., pixels 320a, 320b, 320c, and 320d) of the viewing plane 300. FIG. 1 illustrates that the viewing plane 300 includes only 64 pixels, however it should be appreciated that more or fewer pixels may be used.

In some examples, performing ray tracing includes casting a plurality of rays, from the location of corresponding pixels, each in a straight line in 3D space. Each ray will eventually make contact with and/or intersect something (i.e., either the 3D model 100 or the background). Each corresponding pixel of the viewing plane 300 is then colored based on which part of the 3D model or the background that the ray intersects. If the ray intersects with the 3D model at the cross section plane 200 or within a vicinity thereof, then coloring is applied at the intersection to allow for enhanced visualization of the cross-section of the 3D model.

In the present disclosure, one or more rays (e.g., rays 310a, 310b, and 310c) are truncated such that each ray does not make contact with or intersect anything on the front side 202a (space prior to the ray reaching the user selected or default location of the cross-section plane 200) of the 3D model 100. This enables the resulting image of the viewing plane 300 to bypass the components and surfaces of the 3D model 100 that are located on the front side 202a, and display the components and surfaces of the 3D model 100 on the back side 202b, thereby enabling the display of the cross-section of the 3D model (i.e., the portions of the 3D model 100 at and beyond/behind the user selected or default location of the cross-section plane 200).

In some examples, during the ray tracing process, each ray continues until its first intersection with the 3D model 100 or the background, wherein the first intersection is either in the cross-section plane 200, or on the back side 202b of the 3D model 100. The color of the pixel corresponding to the ray is then determined based on the intersection of that ray.

For example, as shown in FIG. 1, a first ray 310a is cast from pixel 320a, and intersects with the cross-section plane 200 at first intersection point 220a. The ray 310a does not intersect with the 3D model 100 at the intersection point 220a, so the ray continues along its trajectory. The ray 310a intersects with the background, and thus the pixel 320a is colored white.

A second ray 310b is cast from pixel 320b, and intersects with the cross-section plane 200 at second intersection point 220b. At the second intersection point 220b, the ray 310b intersects with the 3D model, or is within a threshold distance of the 3D model (the threshold distance is described in further detail below). In this instance, the corresponding second pixel 320b is colored blue, since pixel 320b corresponds to ray 310b which intersects with the 3D model 100 (or is within a threshold distance of the 3D model 100) within the cross-section plane 200.

A third ray 310c is cast from pixel 320c, and intersects with the cross-section plane 200 at a third intersection point 220c. At the third intersection point 220c, the third ray 310c does not intersect with the 3D model 100, nor is it within a threshold distance of the 3D model 100. The third ray 310c continues on its trajectory, eventually intersecting with the 3D model 100 at point 120c. Point 120c corresponds to an interior surface of the 3D model 100, offset from the cross-section plane 200. As such, the third pixel 320c is colored gray, based on the surface of the 3D model that intersects the third ray 310c at point 120c.

A fourth ray 310d is cast from pixel 320d, and intersects with the cross-section plane 200 at a fourth intersection point 220d. At the fourth intersection point 220d, the fourth ray 310d does not intersect with the 3D model 100. However, the fourth ray 310d is within a threshold distance of the 3D model 100. The fourth pixel 320d is colored blue, since pixel 320d corresponds to ray 310d which is within a threshold distance of the 3D model 100, within the cross-section plane 200.

As noted above, the pixel color for each of the pixels in the viewing plane 300 are determined based on, for each of the plurality of rays corresponding to the pixels, an intersection of each of the plurality of rays with the 3D model or background, and depending upon whether the intersection occurs in the cross-section plane or not.

The processor of the system is then configured to render the pixels of the viewing plane 300 as an image for the user to see.

As noted above, particularly with respect to the fourth ray 310d, the processor may be configured to determine one or more rays that are within a threshold distance of the 3D model 100 at their respective points of intersection with the cross-section plane 200. Because the 3D model 100 and its geometry are defined by one or more mathematical formulas, one or more surfaces of the 3D model may be infinitely thin. Depending on the angle at which a given surface is oriented with respect to the cross-section plane 200, a given ray may not intersect at all. This is because the resolution of the pixels, and/or spacing of the rays (i.e., resolution of the rays) is less than the infinite resolution of the 3D model 100.

For example, if a surface of the 3D model is perpendicular to but still intersecting the cross section plane 200 (i.e., the surface appears edge-on to a viewer), a given ray may extend through the cross-section plane 200 without intersecting the infinitely thin surface, and only farther (or deeper) into the 3D model 100 make contact with a surface of the 3D model. If the pixel is colored based on the intersection farther or deeper into the 3D model 100, it may give the false impression that the 3D model 100 does not intersect the cross-section plane at that pixel.

To account for this, the processor may be configured to determine a threshold distance from the point of intersection between each ray and the cross-section plane 200, such that if any part of the 3D model 100 is located within the threshold distance, the pixel associated with that ray can be colored as if it intersected with the 3D model at that intersection point.

In some examples, the threshold distance extends in two dimensions from the intersection point between the ray and the cross-section plane 200, within the cross-section plane 200.

Alternatively, in some examples, the threshold distance extends in two dimensions from the intersection point between the ray and the cross-section plane 200, perpendicular to the ray. Where the ray is cast such that it is perpendicular to the cross-section plane (e.g., the center pixel where the viewing plane 300 and cross-section plane 200 are parallel), this threshold distance may be the same as the threshold distance noted above. However, where the ray is cast such that it intersects the cross-section plane at an angle (e.g., a pixel on the periphery of the viewing plane 300 where the viewing plane 300 and cross-section plane 200 are parallel, or any pixel of the viewing plane 300 where the viewing plane 300 and cross-section plane 200 are not parallel) the threshold distance may extend at an angle with respect to the cross-section plane 200.

Alternatively, in some examples, the threshold distance can extend in three dimensions from the intersection point between the ray and the cross-section plane 200.

In some examples, the threshold distance can be based on a viewing distance, wherein the viewing distance comprises a distance between the pixel of the viewing plane corresponding to the ray and the ray's intersection with the cross-section plane. The threshold distance and the viewing distance may have a direct relationship, such that the threshold distance increases as the viewing distance increases. So, for instance, if the cross-section plane 200 is parallel to the viewing plane 300 (e.g., the view shown in FIG. 2), rays corresponding to pixels on the edge of the viewing plane may have a larger threshold distance than rays corresponding to pixels in the middle. Additionally, where the cross-section plane 200 is oriented at an angle with respect to the viewing plane 300 (i.e., they are not parallel), rays that intersect with the cross-section plane 200 closer to the viewing plane 300 may have a smaller corresponding threshold distance than rays that intersect with the cross-section plane 200 farther away from the viewing plane 300.

In some examples, the threshold distance can be one pixel's width, half a pixel's width, or some other value. In some examples, a first threshold distance corresponding to a first pixel (and ray) may be set, and the other threshold distances corresponding to the other pixels (and rays) may be scaled accordingly based on their positions with respect to the first pixel and intersection point of the ray. In other examples, a min/max range of threshold distances can be pre-computed based on the distance of the viewing plane and the furthest extent of the model relative to the camera eye. For any given ray-plane intersection, a local threshold value is computed via linear interpolation of the threshold range using the distance of the intersection point from the camera eye. This process ensures that the resulting highlight will have a consistent image pixel-width irrespective of the intersection point's distance to the eye.

In some examples, the threshold distance can depend upon one or more other factors. For example, the system may include a distributed architecture, such that the 3D model is broken up into a plurality of shards, each composed of a plurality of triangles. This distributed nature is discussed in further detail below. The result of the distributed nature, however, is that the threshold distance for a particular ray (i.e., proximity calculation) can prioritize or optimize based on distances within the same triangle, and within the same shard.

If a given ray does not intersect with the 3D model 100 at the cross-section plane 200, (and is similarly not within the threshold distance of the 3D model 100 at this point), then the ray continues to extend on the back side 202b of the 3D model 100 until the ray contacts the 3D model 100 (or the background).

In some examples, the threshold distance is user configurable.

In some examples, the processor is also configured to highlight pixels corresponding to rays that intersect with the 3D model 100 at the cross-section plane 200 (or are within the threshold distance at the intersection of the ray and the cross-section plane 200). All pixels corresponding to rays that intersect the 3D model 100 at the cross-section plane 200 may be colored the same color, or highlighted the same color, wherein the color is different from the color of the model. These pixels may be termed a stencil 150. The stencil 150 is illustrated in FIG. 3, showing in while only those pixels that correspond to rays that intersect the 3D model, or are within a threshold distance of the 3D model, at the point of intersection with the cross section plane 200.

In some examples, the processor may enable various functions based on the ray tracing, rendering, stencil, and other features described herein.

For example, the processor may enable pixel perfect selection of a geometric surface of the 3D model 100, in particular the part of the geometric surface that lies on the cross-section plane 200, for example by comparing a position of a pointer (e.g., mouse icon, touch point, etc.) to the stencil 150. This may be accomplished in a similar manner to the ray tracing operation described above, wherein a ray is cast from the position of the pointer, and the processor determines whether there is any surface of the 3D model within a threshold distance of the ray at the point of intersection with the cross-section plane 200. In this case, the threshold distance may be the same or different from the threshold distance described above with respect to the ray tracing operation. It may be beneficial to increase the threshold distance during the process of selecting a surface, in order to make it easier for a user to select the desired surface.

In some examples, selecting a geometric surface comprises (1) selecting a pixel of the viewing plane, (2) determining a closest highlighted pixel corresponding to the selected pixel of the viewing plane, and (3) selecting the geometric surface of the 3D model corresponding to the closest highlighted pixel.

The processor may also be configured to determine a distance between two geometric surfaces of the 3D model 100. To accomplish this, two surfaces may be selected, in a manner such as described above. Determining a distance between the first selected geometric surface and the second selected geometric surface of the 3D model then includes (1) selecting a first pixel of the viewing plane, (2) determining a first closest highlighted pixel corresponding to the first selected pixel of the viewing plane, (3) selecting the first geometric surface of the 3D model corresponding to the first closest highlighted pixel, (4) selecting a second pixel of the viewing plane, (5) determining a second closest highlighted pixel corresponding to the second selected pixel of the viewing plane (6) selecting the second geometric surface of the 3D model corresponding to the second closest highlighted pixel, and (7) measuring the distance between the selected first geometric surface and the selected second geometric surface.

Various other functions are possible as well by interacting with and analyzing the stencil 150, in addition to the 3D model 100.

As noted above, the system of this disclosure may be configured to operate using a plurality of computing devices in a distributed system. For example, the system may separate the 3D model into a plurality of component parts (e.g., shards). Then, separately for each of the component parts, the system may (1) determine the cross-section plane intersecting the component part of the 3D model, (2) perform ray-tracing by passing each of the plurality of rays through the corresponding pixel of the viewing plane such that each ray intersects the cross-section plane, (3) determine one or more rays that are within the threshold distance of the component part of the 3D model at their respective points of intersection with the cross section plane, and (4) highlight pixels corresponding to the determined rays the same color. The system may then (5) combine the highlighted pixels from each of the two or more component parts into a single image, which can then be displayed to a user.

Further details regarding the distributed nature of operation can be found in U.S. patent application Ser. No. 16/257,393, which is incorporated by reference in its entirety.

Figure 4:
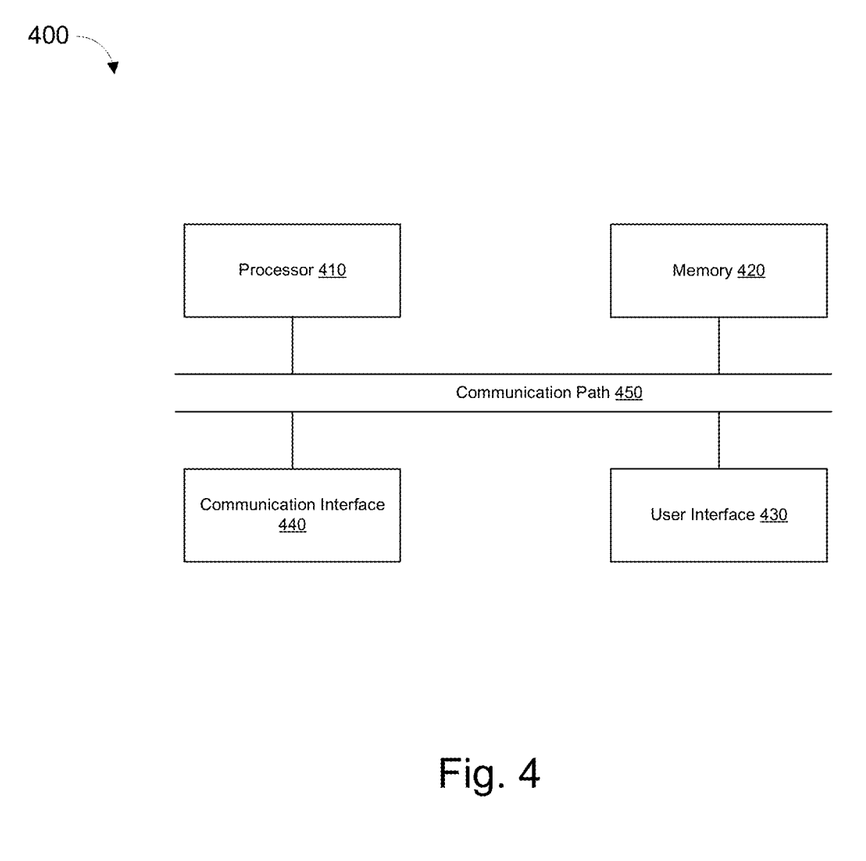
FIG. 4 illustrates an example computing device according to examples of the present disclosure.

FIG. 4 illustrates a simplified block diagram of an example computing device 400 according to embodiments of the present disclosure. Computing device 400 may be configured to perform a variety of functions or acts, such as those described in this disclosure (and accompanying drawings). The computing device 400 may include various components, including for example, a processor 410, memory 420, user interface 430, and communication interface 440, all communicatively coupled by system bus, network, or other connection mechanism 450. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein.

Processor 410 may include a general purpose processor (e.g., a microprocessor) and/or a special purpose processor (e.g., a digital signal processor (DSP)). Processor 410 may be any custom made or commercially available processor. Processor 410 may also represent multiple parallel or distributed processors working in unison.

Memory 420 may include one or more volatile (e.g., random access memory (RAM, such as DRAM, SRAM, SDRAM, etc.)) and nonvolatile (e.g., ROM, hard drive, flash drive, CDROM, etc.), removable, and/or non-removable storage components, such as magnetic, optical, or flash storage, and may be integrated in whole or in part with the processor 410. These and other components may reside on devices located elsewhere on a network or in a cloud arrangement. Further, the memory 420 may take the form of a non-transitory computer-readable storage medium, having stored thereon program instructions (e.g., compiled or non-compiled program logic and/or machine code) that, when executed by the processor 410, cause the device 400 to perform one or more functions or acts, such as those described in this disclosure. Such program instructions may define or be part of a discrete software application that can be executed in response to certain inputs received from the user interface 430 and/or communication interface 440, for instance. Memory 420 may also store other types of information or data, such as those types described throughout this disclosure.

User interface 430 may facilitate interaction with a user of the device, if applicable. As such, user interface 430 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 430 may also comprise devices that communicate with inputs or outputs, such as a short-range transceiver (RFID, Bluetooth, etc.), a telephonic interface, a cellular communication port, a router, or other types of network communication equipment. The user interface 430 may be internal to the computing device 400, or may be external and connected wirelessly or via connection cable, such as through a universal serial bus port.

Communication interface 440 may be configured to allow the device 400 to communicate with one or more devices (or systems) according to one or more protocols. In one example, the communication interface 440 may be a wired interface, such as an Ethernet interface or a high definition serial-digital-interface (HD-SDI). As another example, the communication interface 440 may be a wireless interface, such as a cellular or Wi-Fi interface. In some examples, each of a plurality of computing devices 400 and/or other devices or systems on a network may be configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while some embodiments may include computing device 400 having a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

In the context of this document, a "computer-readable medium" may be any means that can store, communicate, propagate, or transport data objects for use by or in connection with the systems and methods as described herein. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The systems, devices, and methods can be embodied in any type of computer-readable medium for use by or in connection with an instruction execution system or apparatus, such as a computer.

Figure 5:
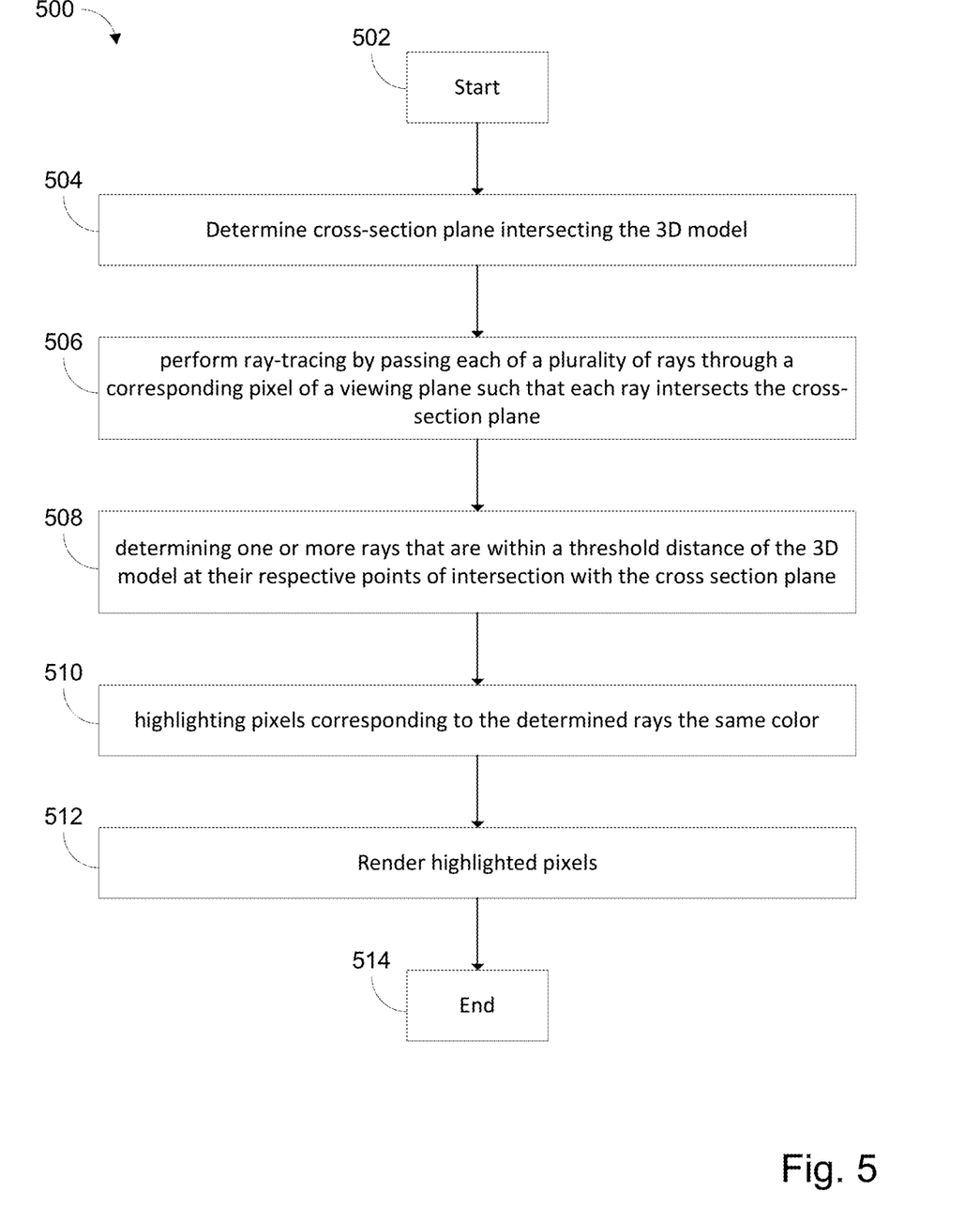
FIG. 5 is flowchart representative of machine readable instructions that may be executed by one or more processors, according to embodiments of the present disclosure.

FIG. 5 illustrates example method 500 for generating a cross-section of a 3D model, according to embodiments of the present disclosure. Method 500 may be performed by one or more computing devices or systems, such as the system described with respect to FIGS. 1-3. The flowchart of FIG. 5 is representative of machine readable instructions that are stored in memory (such as memory 420 of computing device 400) and may include one or more programs which, when executed by a processor (such as processor 410 of computing device 400) may cause one or more systems or devices to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

FIG. 5 begins at block 502. At block 504, method 500 includes determining a cross-section plane intersecting the 3D model. This can be done in any of various ways, such as those described above with respect to FIGS. 1-3.

At block 506, method 500 includes performing ray-tracing by passing each of a plurality of rays through a corresponding pixel of a viewing plane such that each ray intersects the cross section plane.

At block 508, method 500 includes determining one or more of the plurality of rays that are within a threshold distance of the 3D model at their respective points of intersection with the cross section plane.

At block 510, method 500 includes highlighting pixels corresponding to the determined rays the same color. This enables a stencil to be created that includes only those pixels that correspond to rays which intersect the 3D model, or are within a threshold distance of the model, at the point of intersection with the cross-section plane.

At block 512, method 500 includes rendering the highlighted pixels. This causes the stencil of the 3D model components that intersect the cross-section plane to be displayed. Method 500 then ends at block 514.

While one or more specific embodiments have been illustrated and described in connection with the invention(s), it is understood that the invention(s) should not be limited to any single embodiment, but rather construed in breadth and scope in accordance with recitation of the appended claims.

What is claimed is:

1. A method of generating a cross-section of a 3D model comprising:

determining a cross-section plane intersecting the 3D model;

performing ray-tracing by passing each of a plurality of rays through a corresponding pixel of a viewing plane such that each ray intersects the cross-section plane;

determining one or more rays that are within a threshold distance of the 3D model at their respective points of intersection with the cross section plane, wherein for each ray, the threshold distance: (i) comprises a distance in two dimensions extending, within the cross-section plane, from the point of intersection between the ray and the cross-section plane, and (ii) is based on a viewing distance comprising a distance between the pixel of the viewing plane corresponding to the ray and the ray's intersection with the cross-section plane; and highlighting pixels corresponding to the determined rays.

2. The method of claim 1, wherein the cross-section plane defines a front side and a back side of the 3D model, and wherein performing ray-tracing further comprises:

determining a first intersection between each of the plurality of rays and the 3D model from the perspective of the viewing plane; and truncating each of the plurality of rays such that the first intersection between each of the plurality of rays and the 3D model occurs either at the cross-section plane or on the back side.

3. The method of claim 2, further comprising:

determining, for each of the plurality of rays, a corresponding pixel color based on the intersection of each of the plurality of rays with the 3D model;

rendering pixels based on the corresponding pixel color; and, highlighting pixels corresponding to the determined rays the same color.

4. The method of claim 1, wherein the threshold distance and the viewing distance have a direct relationship such that the threshold distance increases as the viewing distance increases.

5. The method of claim 1, further comprising:

selecting a geometric surface of the 3D model, wherein selecting the geometric surface comprises:

selecting a pixel of the viewing plane;

determining a closest highlighted pixel corresponding to the selected pixel of the viewing plane; and selecting the geometric surface of the 3D model corresponding to the closest highlighted pixel.

6. The method of claim 5, further comprising:

determining a distance between a first geometric surface and a second geometric surface of the 3D model, where determining the distance comprises:

selecting a first pixel of the viewing plane;

determining a first closest highlighted pixel corresponding to the first selected pixel of the viewing plane;

selecting the first geometric surface of the 3D model corresponding to the first closest highlighted pixel;

selecting a second pixel of the viewing plane;

determining a second closest highlighted pixel corresponding to the second selected pixel of the viewing plane;

selecting the second geometric surface of the 3D model corresponding to the second closest highlighted pixel; and measuring the distance between the selected first geometric surface and the selected second geometric surface.

7. The method of claim 1, further comprising:

separating the 3D model into a plurality of component parts;

separately, for two or more of the component parts:

determining the cross-section plane intersecting the component part of the 3D model;

performing ray-tracing by passing each of the plurality of rays through the corresponding pixel of the viewing plane such that each ray intersects the cross-section plane;

determining one or more rays that are within the threshold distance of the component part of the 3D model at their respective points of intersection with the cross section plane; and highlighting pixels corresponding to the determined rays the same color, and combining the highlighted pixels from each of the two or more component parts into a single image.

8. A non-transitory, computer-readable medium, having instructions stored thereon that, when, executed by a processor, cause the performance of a set of acts for generating a cross-section of a 3D model, the set of acts comprising:

determining a cross-section plane intersecting the 3D model;

performing ray-tracing by passing each of a plurality of rays through a corresponding pixel of a viewing plane such that each ray intersects the cross-section plane;

determining one or more rays that are within a threshold distance of the 3D model at their respective points of intersection with the cross section plane, wherein, for each ray, the threshold distance: (i) comprises a distance in two dimensions extending, within the cross-section plane, from the point of intersection between the ray and the cross-section plane, and (ii) is based on a viewing distance comprising a distance between the pixel of the viewing plane corresponding to the ray and the ray's intersection with the cross-section plane; and highlighting pixels corresponding to the determined rays.

9. The non-transitory, computer-readable medium of claim 8, wherein the cross-section plane defines a front side and a back side of the 3D model, and wherein performing ray-tracing further comprises:

determining a first intersection between each of the plurality of rays and the 3D model from the perspective of the viewing plane; and truncating each of the plurality of rays such that the first intersection between each of the plurality of rays and the 3D model occurs either at the cross-section plane or on the back side.

10. The non-transitory, computer-readable medium of claim 9, the set of acts further comprising:

determining, for each of the plurality of rays, a corresponding pixel color based on the intersection of each of the plurality of rays with the 3D model;

rendering pixels based on the corresponding pixel color; and, highlighting pixels corresponding to the determined rays the same color.

11. The non-transitory, computer-readable medium of claim 8, wherein the threshold distance and the viewing distance have a direct relationship such that the threshold distance increases as the viewing distance increases.

12. The non-transitory, computer-readable medium of claim 8, the set of acts further comprising:

selecting a geometric surface of the 3D model, wherein selecting the geometric surface comprises:

selecting a pixel of the viewing plane;

determining a closest highlighted pixel corresponding to the selected pixel of the viewing plane; and selecting the geometric surface of the 3D model corresponding to the closest highlighted pixel.

13. The non-transitory, computer-readable medium of claim 12, the set of acts further comprising:
  determining a distance between a first geometric surface and a second geometric surface of the 3D model, where determining the distance comprises:
    selecting a first pixel of the viewing plane;
    determining a first closest highlighted pixel corresponding to the first selected pixel of the viewing plane;
    selecting the first geometric surface of the 3D model corresponding to the first closest highlighted pixel;
    selecting a second pixel of the viewing plane;
    determining a second closest highlighted pixel corresponding to the second selected pixel of the viewing plane;
    selecting the second geometric surface of the 3D model corresponding to the second closest highlighted pixel; and
    measuring the distance between the selected first geometric surface and the selected second geometric surface.

14. The non-transitory, computer-readable medium of claim 8, the set of acts further comprising:
  separating the 3D model into a plurality of component parts;
  separately, using two or more processors for two or more of the component parts: determining the cross-section plane intersecting the component part of the 3D model;
  performing ray-tracing by passing each of the plurality of rays through the corresponding pixel of the viewing plane such that each ray intersects the cross-section plane;
  determining one or more rays that are within the threshold distance of the component part of the 3D model at their respective points of intersection with the cross section plane; and
  highlighting pixels corresponding to the determined rays the same color, and combining the highlighted pixels from each of the two or more component parts into a single image.

15. A system for generating a cross-section of a 3D model, the system comprising:
  a memory configured to store data corresponding to the 3D model; and
  a processor configured to:
    determine a cross-section plane intersecting the 3D model;
    perform ray-tracing by passing each of a plurality of rays through a corresponding pixel of a viewing plane such that each ray intersects the cross-section plane;
    determine one or more rays that are within a threshold distance of the 3D model at their respective points of intersection with the cross-section plane, wherein for each ray, the threshold distance: (i) comprises a distance in two dimensions extending, within the cross-section plane, from the point of intersection between the ray and the cross-section plane, and (ii) is based on a viewing distance comprising a distance between the pixel of the viewing plane corresponding to the ray and the ray's intersection with the cross-section plane; and
    highlight pixels corresponding to the determined rays.

* * * * *